United States Patent [19]

Pannenbecker et al.

[11] E Patent Number: Re. 31,856

[45] Reissued Date of Patent: Mar. 26, 1985

[54] PROCESS FOR PRODUCING FILM AND SHEET MATERIALS FROM THERMOPLASTIC MATERIALS HAVING HOT TACK BY THE BLOWN FILM PROCESS AND THE FILM AND SHEET MATERIALS THEREBY OBTAINED

[76] Inventors: Heinrich Pannenbecker, Postfach 340, 5200 Siegburg; Rudolf Plate, Postfach 140 171, 5300 Bonn, both of Fed. Rep. of Germany

[21] Appl. No.: 329,853

[22] Filed: Dec. 11, 1981

Related U.S. Patent Documents

Reissue of:

[64] Patent No.: 3,880,691
Issued: Apr. 29, 1975
Appl. No.: 236,297
Filed: Mar. 20, 1972

U.S. Applications:

[63] Continuation of Ser. No. 139,088, Apr. 10, 1980, abandoned.

[30] Foreign Application Priority Data

Mar. 23, 1971 [DE] Fed. Rep. of Germany ..... 2114065

[51] Int. Cl.[3] ..... B29F 3/10

[52] U.S. Cl. ..... 156/244.14; 156/244.21; 264/45.9; 264/514; 264/564; 264/173; 425/131.1; 425/133.1

[58] Field of Search ..... 264/514, 515, 173, 564, 264/567, 45.9; 156/244.14, 244.21; 425/131.1, 133.1; 264/45.9

[56] References Cited

U.S. PATENT DOCUMENTS

| | | | |
|---|---|---|---|
| 3,187,982 | 6/1965 | Underwood et al. | 264/95 |
| 3,223,761 | 12/1965 | Raley | 425/133.1 |
| 3,299,192 | 1/1967 | Lux | 264/48 |
| 3,322,870 | 5/1967 | Sacks | 264/95 |
| 3,337,665 | 8/1967 | Underwood et al. | 264/567 |
| 3,567,539 | 3/1971 | Schirmer | 264/512 |
| 3,880,691 | 4/1975 | Pannenbecker et al. | 264/564 |
| 4,048,428 | 9/1977 | Baird, Jr. et al. | 264/514 |
| 4,379,117 | 4/1983 | Baird, Jr. et al. | 264/514 |

FOREIGN PATENT DOCUMENTS

| | | | |
|---|---|---|---|
| 713477 | 7/1965 | Canada . | |
| 1135220 | 12/1968 | United Kingdom | 264/514 |

*Primary Examiner*—Jeffery Thurlow
*Attorney, Agent, or Firm*—Felfe & Lynch

[57] ABSTRACT

Thermoplastic materials which have hot tack and which are incapable of being independently processed by the blown film process due to the tack they show in hot state and especially in the as extruded state are processed to film and sheet by the blown film process by extruding and inflating in a manner known per se an at least two-ply tubular film or sheet of thermoplastic material, the inner ply being formed by a tack-free thermoplastic material and the outer ply superposed thereon being formed by said hot-tacky thermoplastic material; slitting the double-ply tubing for storage and after flattening at least at one edge, and arranging the film web, preferably with winding-up, together with the web of tack-free material in such a manner that one web having hot tack alternates with one tack-free web. The multi-ply film and sheet materials produced by the process are comprised by the invention.

5 Claims, 6 Drawing Figures

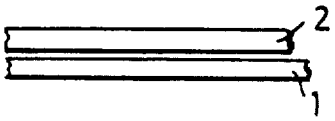
FIG.1
FIG.2
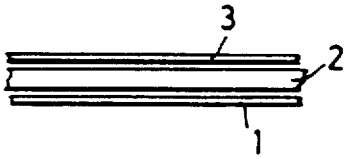
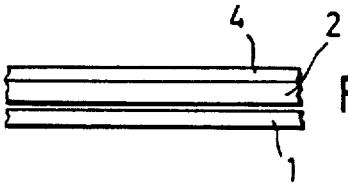
FIG.3
FIG.4
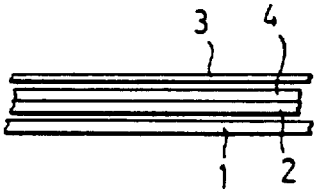
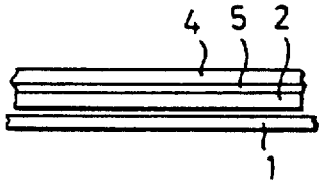
FIG.5
FIG.6
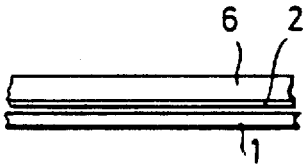

PROCESS FOR PRODUCING FILM AND SHEET MATERIALS FROM THERMOPLASTIC MATERIALS HAVING HOT TACK BY THE BLOWN FILM PROCESS AND THE FILM AND SHEET MATERIALS THEREBY OBTAINED

Matter enclosed in heavy brackets [ ] appears in the original patent but forms no part of this reissue specification; matter printed in italics indicates the additions made by reissue.

This is a continuation of application Ser. No. 139,088 now abandoned, filed April 10, 1980.

This invention relates to the processing of thermoplastic materials having adhesive properties by the blown film process.

The production of self-supporting film from thermoplastic materials by what is known as the blown film process or extrusion of tubular film has been described in detail in the literature of the art, e.g., in the book by Hagen and Domininghaus "Polyathylen und andere Polyolefine," Verlag Brunke Garrels, Hamburg, 2nd edition (1961), pp. 162 to 171, in the references cited therein, and in "Schneckenpressen fuer Kunststoffe" by Schenkel, Carl Hanser Verlag, Munich, 1959, pp. 362–366.

The use of this blown film process has been restricted thus far. It is used above all for producing polyolefin film, especially blown film of high pressure polyethylene. This previously restricted applicability is due to the conditions which are imposed by the process itself on the properties of the thermoplastic material. The material to be processed to self-supporting film is extruded as a seamless tube in thermally plasticized state and then expanded by pulling it over a gas bubble contained in the interior of the tubing. After having been advanced through a cooling passage, the tubing is then flattened by passing it through the nip of a squeeze roller pair. The gas bubble which is confined in this manner in the interior of the tubing between the extruder head and the squeeze roller pair is also responsible inter alia for the selection of thermoplastic materials which are susceptible to processing by the method. A constant heat equalization takes place as the blown tubing is advanced due to heat convection streams in the interior of the bubble so that even with intense external cooling of the blown tubing its temperature is considerably high as it reaches the squeeze rollers, the temperature being, for example, 60° to 90° C. or even higher. In particular, the temperature of the inner wall of the tubing may be higher than that of the outer wall of the tubing.

The tubular film is squeezed in the squeeze rollers to form a gas tight seal. A warm and sticky thermoplastic material necessarily would have the result that the superimposed walls of the tubing would immediately be bonded together. This would miss the technical purpose of the blown film process. Thus, only those thermoplastics are suitable which are no longer tacky at the relatively high temperatures of the film tubing as it is squeezed. Polyolefins, especially polyethylenes which are known to have relatively high crystalline proportions satisfy the requirements of the blown film process. However, other polymers such as high melting point polyamides, polycarbonates, polyvinyl chloride or polyvinylidene chloride which are largely crystalline or comparable with polyethylene with respect to their behavior in the blown film process have also been used.

In connection with this risk that the film tubing becomes bonded a special technical necessity of the blown film process is to be considered: The creaseless flattening especially in the case of film tubing of great diameter is known to involve considerable problems. These are due to both internal stresses caused by nonuniform thickness and non-uniform cooling and especially to differences in the length of way the film tubing goes through in the flattening zone. The film cylinder which is held at one side with a circular cross section is flattened at the other end by the squeeze rollers to form a flattened double-walled material having a linear seal. Simple geometrical considerations show that stresses must occur upstream of and in the squeeze rollers by differences in the distance traversed by the individual parts of the cylinder wall and may readily result in creasing. In order that these stresses can be accomodated by the film tubing material thereby permitting the production of creaseless film, sufficient mutual displaceability of the molecules of the thermoplastic material is a necessary requirement of the process. For this reason, a considerable temperature of the film tubing is necessary as it reaches the squeeze rollers.

Blocking of the formed film tubing occurs in inappropriate operation even in case of those materials which are inherently suited for blowing tubular film. This phenomemon precludes up to this day the use of the blown film process for a great variety of thermoplastically workable materials even if these inherently satisfy the other requirements of such thermoplastic processing, e.g., having an adequate viscosity in extrudable softened state, are solid and not or hardly sticky or tacky at room temperature, and obviously have the capability on principle of forming self-supporting film even in a very thin layer.

Typical examples of such materials include polymers and copolymers which are thermoplastically processable and especially have frequently adhesive properties under the action of heat such as thermoplastic polyurethanes, especially flexible polyurethanes produced by reacting diisocyanates and long-chain polyols (e.g., polyester or polyether polyols) in the presence of chain extenders or copolyamides having increased adhesive properties and melting points up to about 180° C. such as ternary copolyamides of the 6/6,6/12 type. In this connection, reference is made, for example, to the papers "Textilbeschichtung mit ternaeren Copolyamiden" in Kunststoffberater 11, 1968, pp. 900–904, and the company bulletin "Desmopan, Eigenschaften, Anwendung, Verarbeitung" issued by Farbenfabriken Bayer AG, Leverkusen, on Apr. 1, 1970. However, even entirely different polymer types such as high molecular weight polyisobutylenes, thermoplastically workable elastomers, synthetic rubbers in uncured state, high molecular weight polyesters or simply blends of inherently suitable polymer types containing additives which tackify under the action of heat are precluded up to this day from being processed by the blown film process.

It is known to process such thermoplastic materials or plastic blends which are tacky when hot by means of calendars and to stretch them to film while including a sheet of paper which is preferably silicone-coated to prevent blocking when winding up the film. It is also known to process such materials to film by means of extruders and slot dies. In this case, a liner sheet is also necessary as release layer. However, it is impossible or difficult in both processes to produce film within usual tolerance limits. Especially the production of thin film (less than about 50 microns) is impossible. Both processes are to be considered as an economic mode of operation only in special cases. This results from the high investment or cost of installation and the working width with a great amount of edge trimmings inherent in the plant. Therefore, film of materials which cannot be processed by the blown film process is hardly produced up to this day due to the costly and difficult production process.

According to another proposal of the prior art, film is made from such materials which cannot be blown by coating a temporary supporting sheet with a solution of these plastics followed by evaporation of the solvent. The film may then be used in the reversal process. This process is also limited in technical respect and, besides, expensive. The solvent must be evaporated. Film of greater thickness such as more than 100 microns and especially more than 150 microns can be hardly produced. The quality of the film is not comparable with that of an extruded film. A restriction of the molecular weights of the plastics is tolerated in many cases to permit the use of solutions having an adequate solids content.

The production of multi-layer plastic tubing is known from the practice of the blown film process, the individual plies consisting of different thermoplastics which can be processed by the blown film process such as polyethylene, polyamide, polyvinyl chloride, polystyrene or polycarbonate. In this process, the individual plies of thermoplastics are extruded from two or more concentric tubular dies and bonded together immediately after extrusion by being pressed together. Reference is made in this connection to German Pat. No. 1,136,818. It is characteristic of these prior art proposals that each ply of the tubing is formed of a material which can be processed alone by the blown film process.

More recently, it has been proposed to extrude two tubings which are concentric with each other from different thermoplastic polymers and to expand the tubings by blowing, one of the tubings consisting of a polymer having a high melt viscosity and the other tubing consisting of a polymer having low melt viscosity and the tubings being separated after flattening. The high viscosity material is needed as support or carrier which makes possible the processing of the material of lower viscosity and prevents deterioration from occurring on inflating and cooling of the material which has a low viscosity and is accordingly insufficiently strong in plasticised state. Examples of low viscosity materials include crystalline polymers having melt viscosities up to about 7,000 poise, e.g., 500 poise or less, at the extrusion temperatures (177° to 316° C.) such as polyethylene terephthalate, polyamide 66, polyhexamethylene sebacate or a polyurethane obtained by reacting hexamethylene diisocyanate and, for example, 1,4-butanediol; see German published patent application No. 1,504,983. All of these low viscosity materials are also polymers which offer no particular problems with respect to blocking on squeezing, winding and/or in storage of the film tubing. In this proposed process, the material of lower viscosity may be the inner or outer ply of the twin tubing. As regards the characteristics of the polyurethane based on hexamethylene diisocyanate and 1,4-butanediol and mentioned in the published specification, reference is made, for example, to "Ullmanns Encyklopaedie der technischen Chemie," 3rd edition, Vol. 14 (1963, p. 342.)

It is an object of this invention to make the blown film process applicable just to those thermoplastically processable materials which cannot be used up to this day in the blown film process because of the problem of blocking during or subsequent to the blowing process although these thermoplastics are solid and strong at normal temperature and might give self-supporting film. These are thermoplastically processable materials which are tacky when hot and which in many cases in freshly extruded state even after complete cooling exhibit the phenomenon of aftertackiness for a shorter or longer period of time although these thermoplastics are not tacky or at best slightly tacky at normal temperature possibly after an aging period subsequent to thermoplastic softening or heating even when contacting surfaces of the same material or different solid plastic materials. This phenomenon is particularly known for the described polyurethanes having a content of softening segments having longer chains. It is expressly stated, e.g., in the cited bulletin of Farbenfabrikern Bayer AG, page 99, that these polyurethane types do not lend themselves to processing by the blown film process.

The term "warm-tacky" or "hot-tacky" thermoplastics therefore describes materials which are solid and not tacky or only slightly tacky at normal temperature but which when being heated and prior to the transition into the thermoplastically softened state and normally at considerably lower temperatures and/or especially when being cooled from the thermoplastic phase are tacky in solid state to an extent such that processing by the blown film process has been impossible up to the present. It is characteristic of a class of these hot-tacky thermoplastics or compositions containing such thermoplastics which is particularly important within the scope of the invention that they are still tacky in the sense of the problems involved herein for an extended or shorter aging period even if they have been cooled to room temperature after thermoplastic softening.

Accordingly, it is an object of the invention to provide a process for processing thermoplastic materials of the type described above by the blown film process, which thermoplastic materials are tacky when heated, especially in the as extruded state and, therefore, undergo blocking upon flattening or winding after having been inflated to form the tubular film and, therefore, are not susceptible to being independently processed by the blown film process, the process comprising extruding, expanding and solidifying in a manner known per se an at least two-ply tubing of thermoplastic material whose inner ply is formed of a thermoplastic material which is not tacky when hot and whose outer ply surrounding the inner ply is formed of the hot-tacky thermoplastic material; flattening the two-ply tubing and, for storage, slitting it preferably at least at one edge and arranging the hot-tacky film web, desirably with winding up, together with the film web of nontacky material in such a manner that one tacky web alternates with one nontacky web.

For simplicity, the thermoplastic materials which are not tacky when hot and used as auxiliary agent and especially as release agent are referred to hereafter as "non-tacky" materials. Of course, these materials are also tacky in the state of a thermoplastic melt. However, in solid state during and subsequent to the blowing process and when operating in usual appropriate manner, they do not show tackiness which would complicate or make impossible the performance of the blown film process. Preferably they show no or no substantial adhesiveness towards the hot-tacky thermoplastics after the production of the multiply tubular film and its cooling.

It is achieved by the mode of operation according to the invention that the blown film process is safely applicable also to those thermoplastic materials which were previously precluded from this simple mode of operation because of their tackiness in the hot or as extruded state and the problems thereby encountered. In the simplest embodiment of the invention, two different thermoplastic materials are extruded in a manner known per se through two concentric annular dies to form a two-ply plasticized tubing, the inner tubing being formed by non-tacky material and the outer tubing being formed by hot-tacky material. The blown film unit is then operated in such a manner that the inner tubing does not initiate blocking problems as it reaches the squeeze rollers while still permitting creaseless and wrinkle-free flattening of the two-ply tubing. Blocking of the hot-tacky thermoplastic material is prevented by the inner ply of non-tacky material. No tacky tubing surfaces are contacted in the nip of the squeeze rollers. Any problems of bonding to the squeeze rollers themselves can be eliminated by suitably selecting the roller surface and/or the roller material as will be described hereafter in detail.

A further measure is necessary for storage, especially for winding-up such a two-ply tubular film. When simply winding up the tubing, tacky or possibly aftertacky film surfaces would contact themselves. To eliminate the blocking problem also in this stage of the blown film process, the flattened tubing is slit at one side or at both sides and the resultant two-ply slim web, preferably with winding-up, is stored in such a manner that one tacky ply alternates with one non-tacky ply of material. If the tubing is slit only at one side, it must be subsequently unfolded and can then be wound up. If the flattened tubular film is slit at both sides, two webs of material are formed, each consisting of two layers which can be wound up separately or, after inversion, jointly.

It is generally preferred in the process of this invention to conform the thermoplastic processing characteristics of the hot-tacky material to those of the non-tacky material to some extent. Since the specific nature of the hot-tacky thermoplastic material is generally known, it is preferred in accordance with the invention to adapt the characteristics with respect to the thermoplastic processability by suitably selecting the non-tacky thermoplastic material. In doing so, it is to be considered that it may happen just in case of the hot-tacky material that there is a comparatively narrow temperature range within which its thermoplastic processability is satisfactorily ensures. This is particularly true of the two-layer process described herein.

The thermoplastic processability of both the hot-tacky and the non-tacky material is determined especially by the softening temperatures of the particular materials, the width of their softening temperature ranges, by the viscosity of the softened material and the temperature dependence of the flowing behavior in the temperature range of thermoplastic workability.

In the two-ply process described above, it is preferred in accordance with the invention that the softening characteristics of the non-tacky release material be conformed to the nature of the hot-tacky material or the release material or selected in such a manner that it is possible to have the operating temperature of the blown film process determined by the thermoplastic processing characteristics of the hot-tacky material.

It is preferred in this connection that the softening temperature range of the non-tacky release material is not substantially higher than the melting or softening temperature range of the hot-tacky material. Preferably the softening temperature of the non-tacky material is lower than that of the tacky material. Operation may be particularly simple if the softening temperature of the non-tacky material is as much as about 80° C. and preferably up to about 40° C. below the softening temperature of the tacky material. Provided that the plasticized materials have suitable viscosities, this interrelation of the softening temperatures in the process of the invention permits the conformance of the operating temperature of the extruder head and consequently the maximum temperature of the two-layer tubular film to the thermoplastic characteristics of the tacky material. It is then preferred to extrude in a range of temperatures which are as low as possible and which just still permit satisfactory processing of the thermoplastic material having the higher softening or melting temperature. At these operating temperatures, the non-tacky inner tubing can than be safely processed thermoplastically without becoming simultaneously so fluid that new processing problems would be encountered. On the other hand, the selection of processing temperatures which are as low as possible, based on the softening temperature of the tacky material, reduces the tack of the outer layer to the greatest extent possible. However, due to this temperature difference, the extruded inner tubing frequently or generally has no supporting function in the critical phase of inflation. This is in fact unnecessary in the process of the invention because the hot-tacky thermoplastic materials generally have highly viscous self-supporting regions of plasticizability in which they are processed. Nevertheless, some importance may be attributed also to the inner tubing in those cases where hot-tacky thermoplastics or mixtures thereof are processed which have not been virtually uniformly homogenized prior to extrusion. Local fluctuations of viscosity and/or softening temperature of the tacky material can be accommodated by the inner tubing of non-tacky material.

Particular importance is to be attributed to the temperature/viscosity behavior for the selection of the non-tacky thermoplastic material and its conformance to the hot-tacky material in those cases where, for example, there are substantial differences in the temperature/viscosity behavior of the thermoplastic materials to be processed together and/or special dependencies of viscosity on temperature are to be considered. Particularly interesting in this connection may be a case where extremely highly viscous non-tacky thermoplastics are used which, for example, due to the high molecular weight of the non-tacky release agent, permit the blown film process to be operated at temperatures far in excess of the softening temperature of the non-tacky material. Selection of such non-tacky release agents may permit the process to be operated at more than 100° C., e.g., as high as 150° C. or more above the softening temperature of the non-tacks thermoplastics thereby permitting the process to be conformed to the particular softening and viscosity characteristics of specific hot-tacky thermoplastics. On the other hand, it is to be considered that the viscosity of the non-tacky thermoplastic material must not be sufficiently low at the operating temperature that satisfactory formation of the inner layer of the multi-ply tubular film would be interferred with. Suitable blends of material permit the temperature/viscosity behavior of the non-tacky thermoplastic release layer to be varied within wide limits and to conform it to the characteristics of the hot-tacky material to the extent desired or necessary.

The thickness of the layers of the plastic film to be produced can be determined independently for each layer by the plasticizing capacity of the extruder in connection with the draw down rate of the tubing and the gap width of the annular dies. In particular, it is possible in accordance with the invention to produce film of the tacky material having thicknesses within the range from about 10 to 300 microns. Thus, this covers the range of extremely thin film which just is still self-supporting and which could not be produced by prior art processes either by calendering or with slot dies, and the range of sheet of considerable thickness which was difficult to produce by prior art processes and, for example, could not be produced at all by means of spreading processes with dissolved thermoplastic material.

Thus, within the range of self-supporting thin films consisting of the hot-tacky material, it is possible without any difficulty in accordance with the invention to produce film having thicknesses of less than 100 microns, especially up to 50 microns. Self-supporting film of 10 to 25 microns in thickness may be extremely important for commercial use. However, it is also possible on principle by means of the invention to blow, in connection with the non-tacky inner tubing, films of the hot-tacky material which are sufficiently thin that these layers of the hot-tacky thermoplastics can no longer be referred to as genuine self-supporting film. The production of such thin film consisting of the hot-tacky thermoplastics may be desired in special cases. In general, these non-supporting film layers are then processed together with the film web of non-tacky release material which is usually stripped off after the hot-tacky film has been transferred to the material to be coated. The thickness of such film which is not a truly self-supporting film consisting of the tacky thermoplastic material may be less than 10 microns, e.g., about 5 microns.

To achieve as economical a mode of operation as is possible in the two-ply process described above, it is preferred to extrude the film of tack-free material and that of tacky material in specific ratios of the thicknesses dependent upon the thickness of the film of tacky material. In the range of medium thicknesses of the layer of tacky thermoplastics, i.e., about 50 to 100 microns, it is preferred to extrude the non-tacky material with about the same thickness so that the ratio of the thickness of the tacky material to that of the non-tacky material generally ranges from 1:0.8 to 1:1.2. In the range of thinner film of tacky material, i.e., about 10 to 50 microns, it is preferred in accordance with the invention to extrude the film of non-tacky material with a greater thickness, suited being especially ratios of thicknesses of 1:1.5 to 1:2.5 or even lower ratios. If the layer of tacky material is formed with a thickness in excess of 100 microns, then the thickness of the film of simultaneously processed non-tacky material may be lower than that of the tacky material. Preferably it ranges between 1:0.9 and 1:0.6. The thicker the layer of tacky material, the thinner the tubing ply of non-tacky may be held.

These measures which are preferred in accordance with the invention are certainly due to several causes. One important factor is supposed to be the fact that increased frictional forces are encountered and to be overcome for the hot-tacky outer layer of the inflated tubing in the stage of flattening which normally is effected with the use of curved or flat guide plates upstream of the nip of the squeeze rollers. The last-described measures taken in accordance with the invention ensure that the blown tubular film has adequate mechanical stability also in this case. At the same time, it is ensured, especially when producing film with greater thickness, that no excessively thick walls of the multi-ply tubing are built up which might create additional difficulties in the process when the tubing is cooled due to the known poor thermal conductivity of the polymeric material in connection with the own weight of the pending tubular film, this weight being substantial in this case. However, any problems resulting from a possible inhomogeneity of the thermoplastic melts or from creasing on flattening are also favorably influenced by the measures described above with respect to the relative thickness of the layers.

In a further embodiment of the invention, tubular film having three plies rather than the two plies described above is produced by extruding a three-layered plasticized tubing in which the tacky thermoplastic material forms the central layer which is covered on both sides, i.e., the internal surface and external surface of the tubing with non-tacky thermoplastic material. This embodiment of the present process may be of particular importance for all those thermoplastic compositions which cause particular difficulties when processed by the blown film process. In this embodiment, the blocking material is completely covered by non-blocking material and, therefore, contacts in substantially no moment any parts of equipment or other surfaces.

It is evident that this ensures a great variety of applicabilities of the blown film process to materials which previously could not be processed by this process. After the film production which does not offer particular difficulties even in the wiknding step so that the tubular film can be wound up as such even in non-slit state and, if desired, after storage, the material is passed in processing. For this purpose, the plies of non-tacky material, similar to the processing of the material obtained by the two-ply process, are normally separated, especially stripped, which is possible without any difficulty. This will be dealt with hereafter in detail.

It may be preferred in this embodiment of the present process, i.e., when producing three-ply tubular film, to form at least at the outer surface of the tubing as thin a layer as is possible of the non-tacky material, this layer preferably having a thickness not greater than 100 microns and more preferably within the range from 20 to about 50 microns or even less. It may be preferred that also the inner layer of the tubing of non-tacky material is as thin as possible. In this manner, the tubular film of the tacky thermoplastic material is covered at least on one side and, if desired, on both surfaces with only a thin skin of the non-tacky material while yet having eliminated the difficulties which result from hot tack of the tacky material. It is preferred also in case of this embodiment that the total wall thickness of the multi-ply tubing does not exceed about 400 to 500 microns to eliminate additional problems.

In the three-ply process, the non-tacky material of the inner and outer layers of the tubing may be like or different. Different materials will be used on the basis of practical considerations in those cases where this is desirable in view of the particular process conditions. A case of this kind may be one where the difference between the softening temperatures of the non-tacky inner material and that of the tacky thermoplastic material is substantial. Since the tubing as a whole must be adapted to the processing temperature of the thermoplastic material or mixture of thermoplastic materials which has the highest melting point, it may be desirable in this case to select as the non-tacky outer layer a material, the softening temperature of which is closer to, or even in excess of, that of the tacky material. However, in addition to, or in place of, this measure more intense cooling or a longer distance traversed by the inflated tubular film prior to flattening may be provided.

Preferred non-tacky thermoplastic materials for the process of the invention are polyolefins, above all those polyolefins which have a substantial content of crystalline portions. Particularly preferred non-tacky thermoplastic materials for the present process are the polyethylenes and polypropylene. Depending upon their properties which are the result of the production process, they are selected so as to match with the tacky thermoplastic materials to be processed. Blends containing polyolefins, e.g., mixtures with waxes or other additives lowering the melting point or viscosity may be used when properly conformed to the particular hot-tacky material. For example, blends with polymers of lower molecular weight may be used if this is required by the particular tacky thermoplastic material or the associated operating temperature.

For example, conventional inexpensive high pressure polyethylenes are suitable non-tacky materials for the processing of thermoplastic materials having softening temperatures up to about 170° C. Thermoplastic polyurethanes having adhesive properties and corresponding copolyamides of the type described above are typical examples hereof. The polyolefin may be conformed to the operating conditions determined by the tacky thermoplastic material on the basis of viscosity characteristics and/or softening temperature. Favorable in the sense of the invention is the fact that highly viscous polyolefin types, e.g., low pressure polyethylenes, permit the use of operating temperatures up to 280° C. and more while, on the other hand, other polyolefins permit adjustment of softening temperatures around 100° C., or even below 100° C. Therefore, a very wide range of operating temperatures is available.

The use just of the polyolefins as a non-tacky material is particularly favorable because, in addition to economy (this auxiliary material which in itself is very inexpensive may be reused) and the easy conformance of the type of material to the particular requirements of the tacky thermoplastic material result in an additional important advantage. Adhesion between the tacky thermoplastic material and the polyolefin layer is low in the multi-ply finished product. The plies are readily separated. The poor adhesion between the layers is promoted by a preferred feature of the invention: The individual layers of the multi-ply tubular film to be formed are preferably contacted within the extruder head before the seamless tubing is discharged into the ambient atmosphere thereby precluding any adhesion-promoting oxidation reaction at the surface of the non-tacky material contacting the tacky thermoplastic material.

Suitable thermoplastic materials having tacky properties include substantially all systems of materials which are capable within a technically reasonable temperature range of being thermoplastically processed, i.e., which are especially extrudable in thermoplastic state but are not processable alone by the blown film process. Preferably the tacky material melts or is softened at temperatures below about 300° C., especially up to about 220° C. A great number of technically important thermoplastic materials of this kind melt or become softened already at temperatures up to about 170° C. All of these materials may be used together with suitably selected polyolefins as the non-tacky material. With thermoplastic materials having higher melting points or softening temperatures and tacky properties, either the selection of non-tacky materials having higher melting points or other operational modifications are desirable. For example, such tacky thermoplastic materials of higher melting points may be used in mixture with components lowering the melting point.

In general, mixtures of materials may be used in the phase of the tacky thermoplastic material provided that the blend is susceptible to substantially homogeneous thermoplastic processing but does not undergo undesirable changes and, under the conditions of the blown film process, does not show reactions interferring with the process. However, it is well possible that the condition of the tacky polymer undergoes changes within certain limits during processing without the necessity that this results in detrimental effects. For example, it is occasionally found when repeatedly processing thermoplastic polyurethanes that the melting range of these materials is lowered upon repeated plasticization. Nevertheless, polyurethane film produced therefrom is a highly useful material.

Particularly important thermoplastics having tacky properties are the hot-tacky polyurethanes described above and having been prepared with the use of long-chain glycols as flexible chain segments, e.g., polyesters or polyether glycols having molecular weights in the range of about 500 to 5,000. These materials which show aftertack in the as extruded state accept their optimum physical characteristics in known manner when stored at room temperature and find a great variety of uses. Copolyamides, e.g., ternary copolyamides having melting points in the range from about 90° to 180° or 170° C. and, as is known, are especially used as heat-sensitive adhesives in textile processing may constitute a further important class of thermoplastic materials having tacky properties. It is generally possible to produce adhesive film from what is known as primer materials, to convert heat-sensitive adhesives into film, work thermoplastically processable elastomers of any structure having tack in the sense of the invention, high molecular weight polyesters or other polymerization, polycondensation or polyaddition products as far as they are thermoplastically processable and fall within the definition of the thermoplastic materials having hot tack and used in accordance with the invention.

In connection with the definition of the hot-tacky thermoplastics used in accordance with the invention, the following important point is to be stressed: Since it is practically impossible up to this day to produce self-supporting film, especially thin self-supporting film from hot-tacky thermoplastic materials or mixtures used for the purposes of the invention, the indirect route of coating solutions on substrates followed by evaporation of the solvent is taken especially for producing thin layers of materials of this kind. However, operation with solvents in many cases requires certain restrictions, especially with respect to the molecular size of the plastics components to bring the solids content of the coating composition and its viscosity into a technically acceptable relationship. A great number of synthetic plastics which are attractive primarily for the production of film is hardly available up to this day in a degree of condensation of polymerization sufficiently high that thermoplastic processing would be convenient. The reason hereof is simply the fact that methods of thermoplastic processing into thin and ultrathin film were not available up to the present. The possibility provided on principle by the invention of processing any thermoplastic material of the type defined above into ultrathin film gives the possiblility to the synthesis art on the basis of the previous knowledge about compositions of matter to produce higher viscosity, especially higher molecular weight plastics of types which are known per se which may then be thermoplastically processed into sheet and film and used advantageously.

For example, compositions based on thermoplastic materials and containing high boiling point plasticizers or mixtures of polymer types which are compatible with one another, mixtures with finely divided solids, e.g., pulverulent fillers, are processable on principle unhesitatingly and independently of their tack in hot state. In this connection, it is important with respect to the definition of the thermoplastically processable hot-tacky plastic materials used in accordance with the invention that this definition also covers compositions consisting of plasticizers and/or additives increasing the tack and those thermoplastic materials which as such cannot be tacky and would be processable even by the blown film process without the addition of tack-increasing additives. However, it is then characteristic of the mixtures of this kind used in accordance with the invention that the particular composition of the thermoplastic material which is inherently non-tacky with, for example, the plasticizer and/or the tack-increasing additive can no longer be processed as such and alone by the blown film process.

It is particularly interesting for the adhesive field that mixtures of thermoplastically processable materials with tack-improving, additives, e.g., tackifying resins, can be processed at any time by the process of this invention provided that the composition in cooled state does not adhere undetachably on the release layer of the non-tacky thermoplastic material. It is possible by appropriatemy formulating the composition to provide adhesive films which are highly tacky when hot at predetermined temperatures but show hardly an adhesive effect or only a slight adhesive effect at ambient temperatures.

When appropriately conforming the non-tacky release layer to the softening characteristics of the hot-tacky thermoplastic material, it is possible to process also those materials having hot tack which have only a very limited temperature range within which they are susceptible to thermoplastic processing. As little as a few degrees centigrade, e.g., a range of 5° to 10° C. within which thermoplastic processing is possible may be sufficient with fine temperature control to permit processing of such materials having hot tack by the process of the invention. A further advantage resides in the fact that the process of the invention permits the production of films having thicknesses coming up to predetermined tolerances and being either very thin or comparatively thick dependent upon the particular desired use.

In a further and particularly important embodiment of the invention, it becomes possible in addition to what has been described above to produce novel composite sheet or film which may have a great variety of compositions and structures while being conformed to the particular predetermined uses in a manner which has been unknown heretofore.

To produce such composite sheet or film or laminates, three or more layers are generally extruded. The internal ply of the extruded tubing always consists of the non-tacky release agent of the type described above, i.e., especially of a polyolefin having characteristics conformed to those of the other thermoplastics. Various possible variations are then possible for the further plies of the tubing arranged concentrically about this internal ply.

In a first embodiment of this aspect of the invention, the internal ply of non-tacky thermoplastic material is followed by a layer of tacky thermoplastic material falling within the above definition. As the third layer which is usually the outer layer in this case, a layer of a thermoplastic material is applied which is not a release agent in the sense of the internal polyolefin layer but is intimately and preferably undetachably bonded to the layer of hot-tacky thermoplastic material. Suitable materials for these outer layers in case of the embodiment now described include non-tacky, thermoplastically processable and extrudable materials which impart specific characteristics to the double film formed after removal of the polyolefin release layer. This embodiment is illustrated by means of several examples:

In the blown film process, a central layer of polyurethane constituting the hot-tacky thermoplastic layer may be extruded onto the internal layer of polyolefin, the former being in turn coated on its outer surface by a layer consisting of a high molecular weight polyamide of high melting point. Processing of the tubular film to form the flattened web and separation of the polyolefin substrate give a double film consisting of a polyurethane ply at one side and a polyamide ply on the other side. The two layers of polyurethane and polyamide are undetachably bonded together. It is possible to control at will the thickness of the polyamide coating on the polyurethane layer. In particular, it is possible to apply extremely thin filmy polyamide coatings having a thickness of, for example, less than 10 microns. Self-supporting polyamide film having this thickness cannot be processed in practice so that a corresponding composite film cannot be produced from preformed webs by a conventional coating process. The only conventional mode of operation available for this purpose is the coating of a polyurethane substrate with a solution of the polyamide. However, this operational measure entails limitations and disadvantages. It is possible in accordance with the invention to achieve optimum conformance to the particular intended use by varying the structure of the composite film or laminate. For example, a layer of polymeric terephthalate or any other thermoplastically processable plastic material can be applied in place of the polyamide layer. The advantages which, for example, result herefrom for the field of producing artificial leather are apparent.

In a second embodiment of the aspect of the invention now described, three layers are again extruded to form the tubing to be expanded by the blowing process. The inner layer again consists of the non-tacky release agent, e.g., a thermoplastically processable polyolefin. The central ply covering the inner ply consists of a hot-tacky material of the type defined above. This central layer is covered by a third layer which also consists of a hot-tacky thermoplastic material in accordance with the definition of the invention but exhibits a nature which is different from that of the central layer. A simple example is the case where the central layer consists of a copolyamide having a low melting point and the outer layer consists of a polyurethane having hot tack. In the blown film process, the two layers of thermoplastic materials are united undetachably. For finishing or for the processing desired of the resultant double film, they can be readily separated from the release layer consisting of the polyolefin. This results in a double-ply composite film which has different optimum adhesive properties on its two surfaces. Two-ply adhesive films of this kind provide previously unknown possibilities of solving problems encountered in making adhesive bonds. It is to be understood that the combination described above of a polyurethane layer with a copolyamide layer has been merely mentioned by way of example. Depending upon the particular use, i.e., especially the nature of the materials to be bonded together, composite films of any kind can be produced from members of the extensive class of thermoplastic materials having hot tack.

In a third specific embodiment, the two-ply composite film described above is varied. In this embodiment of the invention, a thermoplastic material having hot tack, e.g., polyurethane, is again applied to an inner layer of the non-tacky release composition and is followed by a thermoplastic layer consisting of a material having specific physical characteristics, e.g., high strength, and being intimately bonded to the hot-tacky thermoplastic material in the blown film process whereupon a layer consisting of a thermoplastic material having hot tack is again applied as the outer layer.

Finally, after stripping of the non-tacky substrate film consisting, for example, of polyolefin, a three-ply composite film having a central layer of plastic material of particularly high strength coated on both surfaces with a thermoplastic layer having hot tack is available for processing. The material having particularly high strength may, for example, be a conventional polyamide or a polyterephthalate while the outer layers of thermoplastic material having hot tack may again be polyurethanes or copolyamides. All of the above details are merely given by way of example. In place of the particularly high strength, the central ply may introduce entirely different properties into the composite film, e.g., improved high-frequency weldability, improved moisture barrier properties, particularly high flexibility or elasticity or whatever properties are desired to be introduced. Conformance of such composite films to almost any use desired appears to be possible in view of the great variety of synthetic plastics known up to date. All of the production processes described herein for composite film are to be understood in the light of the details previously given with respect to the two-ply and three-ply processes according to the invention.

In a further particular embodiment of the invention, it is possible to produce foamed film from thermoplastic materials or of composite film comprising layers of foamed material. It is known to incorporate solid blowing agents in thermoplastic materials, which blowing agents are decomposed at the processing temperature with formation of a gas or simply dissolve low boiling components such as lower halohydrocarbons in thermally plasticized plastics under pressure. If such a composition is then extruded into normal conditions with a sudden pressure drop, directive foaming of the plasticized material takes place. The resultant foam solidifies. According to the invention, this measure which is known per se may also utilized within the framework of the possibilities described above. For example, film consisting of foamed thermoplastic materials having hot tack such as polyurethanes can be produced by the blown film process using the two-ply or, if desired, the three-ply method. It has been found that also such a foamed layer consisting of the thermoplastic material having hot tack can be separated without any difficulty from the non-tacky release material, e.g., the polyolefin layer. Actually, the foam adheres only very loosely to the polyolefin film produced in the blowing process, which is to be considered when winding and further processing the material.

It is further possible in accordance with the invention without any difficulty to unite foamed film of this kind with non-foamed layers which undetachably adhere thereto. For example, a foamed polyurethane film may be bonded to a non-foamed polyurethane or copolyamide layer. Desirably the process of the invention is operated in such a manner that the foam layer forms the outermost ply of the tubing to be inflated while the continuous layer consisting, for example, of polyurethane or copolyamide is extruded as the central layer.

However, it is not necessary in the present process to produce the foamed film from a thermoplastic material having hot tack in the sense of the invention. It is also possible to produce composite sheet from foamed conventional material and a thermoplastic material having hot tack in the sense of the invention. An example is a composite film consisting of a foamed P.V.C. film or a foamed polystyrene layer in connection with a non-foamed polyurethane layer. When considering the additional possibility of varying the thicknesses of the individual layers, the extent to which the invention expands the field of blown film production which generally is to be regarded as a particularly simple process of producing film becomes obvious. In this embodiment of the process, it is also possible to use mixtures in the individual extruded layers of the thermoplastic tubular film to conform the chemical and mechanical and physical characteristics of the layer and consequently of the composite film to the intended use to an optimum degree.

It will be readily appreciated that the thickness of such a foamed layer may exceed the values given above for non-foamed layers, especially the upper limit of the range specified. The foaming process increases the thickness. Thus, it is possible without any difficulty to produce sheet having a thickness of 300 to 500 microns or substantially thicker layers in excess of 1 mm. On the other hand, a thin foamed film layer having a thickness of, for example, 100 microns may be produced by varying the operating conditions.

Specifically, the blown film process is normally carried out with downwardly directed extrusion. Other directions of extrusion, e.g., upwardly, are not excluded. However, extrusion in downward direction is particularly desirable, especially if the thermoplastic material having hot tack forms the outer ply. It is advantageous to extrude from an extruder head having two, three or more annular slots each of which has associated with it an extruder feeding the plastic materials mentioned above. The particular temperature in the extruder screws and in the extruder head having the concentric annular slots is determined by the softening temperature of the materials to be processed with consideration given to the viscosity characteristics. It is preferred, especially for the materials having hot tack, to extrude homogenized melts. The operating temperatures in the extruder head may, for example, range between about 90° and 280° C. Preferably the operating temperature is in excess of about 100° C., e.g., within the range from 100° to 220° C. and more preferably up to about 180° C.

The concentric annular slots can be separately centered. Desirably they advance the individually fed tubular webs convergently together within the extruder head immediately before the outlet orifice so that the multy-ply tubing leaves the extruder head with the plies of thermoplastic material superposed. The thickness of the individual layers and consequently the total thickness of the multi-ply tubing is controlled especially by the plasticizing capacity of the individual extruders and consequently by the rate at which the thermoplastic material in question is fed through the annular die, by the draw down rate of the multi-ply tubular film, and by the expansion or inflation ratio of the tubing as it is inflated. If desired, the thickness of the individual layers of the thermoplastic material can be additionally influenced by adjusting the slot width of the individual concentric annular dies which are preferably variable in the present process.

Preferred gap widths of the annular dies for one used, especially layer of thermoplastic material are within the range from about 0.5 to 1.0 mm. and preferably 0.5 to 0.8 mm, the annular orifice of the extruder head from which the multi-ply tubing emerges being conformed thereto. The width of this annular gap may be about 1 to 3 mm. Smaller or greater gap widths may be used depending upon the requirements. Suitable draw down rates are within the range of, for example, 2 to 30 meters/minute. However, higher draw down rates may be used, especially when extruding thin film. The maximum expansion ratio of the tubular film is within usual limits, the upper limit being, for example 1:3. In general, such extensive expansion will not be used,d especiallly when producing thicker film. It is technically more convenient in this case to use annular dies of greater diameter and to operate with lower expansion ratios. It is even possible to operate with a draw down ratio lower than 1:1, i.e., to narrow down the tubular film as it is drawn down. This measure which is to be taken in special cases is to be considered especially for the production of thicker sheet of the tacky thermoplastic material (250 or 300 microns or more).

The width of the film is determined by the diameter of the annular dies used in connection with the expansion ratio. Film widths of about 1.5 to 3 m. which are particular important in practice can be adjusted without any difficulty.

In the step of flattening the inflated tubular film over curved or even guide surfaces upstream of the squeeze rollers, it is preferred to reduce to the greatest extent possible the adhesion between the outer surface of the tubing and the guide plate. This can be accomplished by various auxiliary means. For example, the guide plates may be provided with a release coating reducing adhesion, e.g. with a cover of polytetrafluoroethylene. However, it is particularly preferred to keep the area of contact between the guide plate and the outer wall of the tubular film as small as possible.

The guide plates may be perforated, or only a few points of contact may be provided by placing rods on the guide plates. When producing two-ply film by the present process, the area of actual contact between the guide plate and the tubular film should not be more than about 10 percent of the total guide plate surface area made use of.

The squeeze rollers may be conveniently conformed to the problems of the present process, especially when blowing two-ply tubing. The hot-tacky outer layer of the inflated tubular film and the temperature of the tubing in the nip of the squeeze roller pair are to be considered in this connection. For example, it may be advantageous to coat also the surface of these squeeze rollers by suitably treating them with tack-reducing materials. For example, the use of rollers covered with polytetraflouroethylene and/or of silicone rubber rollers is particularly suitable.

The process of the invention makes accessible virtually novel possibilities of producing blown film and consequently the production of film having thicknesses within a range which is particularly interesting for commercial use. This process permits the production of film in a simple manner from materials which previously could not be considered for processing to blown film and, if at all, were only processable to film with difficulties. Novel composite films of various structure have become available.

The invention further comprises the film of hot-tacky thermoplastic material produced by the novel process and the composite materials including such a film layer.

The most simple embodiment of the invention is a film web in the form of a longitudinally slit double-ply tubing part which has one layer consisting of the thermoplastic hot-tacky material and another layer consisting of the non-tacky thermoplastic material. FIG. 1 of the accompanying drawing shows largely magnified and diagrammatically a cross section of this material. The flattened and slit double-ply tubular film comprises as one ply 1 the non-tacky thermoplastic material and as the second ply 2 adhering readily detachably thereto the hot-tacky thermoplastic material. The narrow gap shown in FIG. 1 and the following FIGS. 2 to 5 between the film webs indicates that the adjoining surfaces are not tightly bonded together so that the two film layers may be separated for or in processing. On the other hand, if the drawings (FIGS. 3 to 5) shows at least two adjoining film plies without any gap therebetween, this means that these film plies are tightly and preferably substantially undetachably bonded together.

The invention further comprises three-ply and preferably slit tubular film which is diagrammatically shown in FIG. 2. A lowermost layer of a non-tacky thermoplastic material 1 which was the inner layer of the extruded tubing when producing the film is loosely bonded with little adhesion to the layer 2 of the hot-tacky thermoplastic material. Superposed on this hot-tacky thermoplastic layer is the non-tacky thermoplastic layer 3 which was the outer layer when extruding the tubular film and after cooling of the extruded material is only loosely adherent to the hot-tacky thermoplastic layer. The plies 1 and 3 may consist of identical or of different materials, e.g., of different polyethylenes dependent on the softening characteristics of the hot-tacky central ply 2.

FIG. 3 shows another embodiment of the films of the invention based on hot-tacky thermoplastic materials. The non-tacky release ply 1 originally provided again as the inner tubing is loosely adherent to the central ply 2 of hot-tacky thermoplastic material. A ply 4 is superposed on and tightly adherent to the ply 2. This ply 4 can be detached only jointly with the central ply 2 from the non-tacky supporting material 1. The ply 4 may have various compositions. It may consist of a hot-tacky thermoplastic material which, however, has a composition and nature different from those of the central ply. In this case, the product is a two-ply composite film which has different adhesive characteristics at the two major surfaces. However, the ply 4 may also consist of a material which is susceptible to being processed by the blown film process but is not undetachably bonded to the hot-tacky thermoplastic material 2 in the blowing process. A typical example of such a combination of materials is a central ply 2 of low-melting and hot-tacky copolyamide in connection with a high-melting polyamide web based, for example, on polycaprolactam or polyamide 66. The ply 2 may also be a polyurethane of the type described above while the ply 4 which is strongly adherent thereto is a polyamide or a polyethylene glycol terephthalate.

FIG. 4 shows a further embodiment of the composite sheet material of this invention. This embodiment results from a combination of operational measures leading to the composite films of FIGS. 2 and 3. The non-tacky release ply 1 is loosely adherent to the hot-tacky thermoplastic material 2 which in turn is tightly adherent to the central ply 4. This ply 4 is the same as the ply 4 described in connection with FIG. 3. Loosely bonded to and superposed on the ply 4 is the cover ply 3 which is the same as the ply 3 described in connection with FIG. 2. Thus, a two-ply composite film which is covered on both major surfaces with non-tacky thermoplastic material is produced in this embodiment. For processing, the plies 1 and 3 may be removed.

Finally, a further embodiment of the invention is shown in FIG. 5. Here again, a three ply composite film is loosely branched to the non-tacky carrier film (1). However, the three layers of this upper web are strongly bonded together. The intermediate ply 2 consisting of a hot-tacky thermoplastic material adjoins a web 5 which is strongly bonded to both the ply 2 and the ply 4 superposed thereon. 5 is a central ply which has been incorporated in the composite film to impart thereto specific mechanical or high-frequency weldability, impermeability to water and the like.

As a further embodiment which is particularly important for the invention, FIG. 6 shows a tackfree support sheet 1 which is the internal ply when extruding the plasticized tubing, this inner ply having superposed and loosely adherent therety a ply 2 of thermoplastic material having hot tack. This ply 2 is in turn strongly adherent to the sheet 6 which is considerably thicker and is a foam sheet in the embodiment shown in FIG. 6. This foamed sheet has been formed by extruding a thermoplastic material containing a blowing agent. In this manner, a composite sheet comprising the layers 2 and 6 has been formed which offers particular advantages in specific uses, especially for coating textiles. When laminating a textile material with this composite sheet through the foam sheet 6, there is obtained after separation of the tackfree support film 1 a composite material, the outer plastic layer 2 of which is cushioned against the textile substrate through the foam sheet 6. This cushioned positioning of the outer plastic web may entail substantial advantages for a great number of uses, especially in the field of artificial leather or leather substitute. In processing and in use, the structure of the textile filamentous material is incapable of being pressed through into the outer plastic ply 2.

The invention comprises foamed sheet and its production, which have been produced without the concomitant use of the interlayer 2. Thus, in this embodiment, the foamed sheet 6 is directly superposed on and loosely adherent to the tackfree substrate 1. This embodiment has not been separately represented in a drawing because it corresponds on principle to the embodiment represented in FIG. 1 in which the ply of plastic material having hot tack 2 would then be a foamed sheet.

Finally, the invention comprises the sheets represented in FIGS. 1 to 6, but in each case after removal of the non-tacky release ply 1 and, if present, the release ply 3.

The invention will be further illustrated by the following examples.

EXAMPLE 1

Two extruders were connected to a downwardly directed extruder blow head having two concentric annular slots each of 0.7 mm. width which, however, united within the blow head to form a common annular slot having a width of 1.4 mm. and a diameter of about 80 mm. Each of the two tubular slots united in the die orifice were susceptible to be separately centered by suitable adjusting screws. The extruder feeding the internal tubular slot had a feeding capacity of about 10 kgs./hr. of high pressure polyethylene while the extruder feeding the outer tubular die conveyed 12.5 kgs./hr. of thermoplastic polyurethane to this die. The Polyethylene had a softening temperature of about 130° C. with medium melt viscosity characteristics. The softening temperature of the polyurethane was about 150° C.

The operating temperatures in both extruders were maintained between 165° and 175° C. The temperature in the extruder blow head was 165° C.

The circumference of the expanded tubular film or the width of the film web having been slit once was 700 mm. The thickness of the polyethylene release film was 45 microns and that of the polyurethane film was 50 microns. The tolerance of the wall thickness of the polyurethane film produced was ±10 percent. The polyurethane film was distinguished by particularly high homogeneity which was superior to the results which are obtainable when calendering the same material.

The tubular film was slit, flattened and wound up. The polyurethane film and the polyethylene film can be readily separated for processing.

EXAMPLE 2

A copolyamide 6/6,6/12 having a softening temperature of about 130° C. was processed with the blown film equipment described in Example 1 under the operating conditions mentioned in claim 1 with the use of the same high-pressure polyethylene. However, the operating temperature in the extruders was about 150° C. The temperature of the extruder head was also about 150° C.

The circumference of the double-ply tubular film or the width of the film having been slit once was 700 mm. The thickness of the polyethylene release film was 25 microns and that of the copolyamide film 20 microns.

It is not possible to produce copolyamide film having this small thickness by means of a flat slot die. The optical quality of the copolyamide film produced by the blown film process was superior to that of a film produced by means of a flat slot die.

EXAMPLE 3

An extruder equipment described in Examples 1 and 2 and equipped with an extruder blow head having two concentric tubular slots each of 0.7 mm. width was used. The diameter of the die orifice formed by uniting the two tubular slots shortly upstream of the die face was about 225 mm. The internal tubular slot is fed with a high-pressure polyethylene of higher melt viscosity while a polyurethane having a softening temperature within the range from 165° to 170° C. and having admixed therewith 10 percent of chalk is fed to the outer tubular slot.

The processing temperature of both of the materials in the extruders ranges between 180° and 190° C. The temperature at the extruder head is 180° C.

The extruded tubular film is inflated to a circumference of about 1,800 mm. so that the tubular film by slitting twice gives two double-ply film webs of 900 mm. width each. The thickness of the polyethylene release film is 90 microns and that of the polyurethane film 100 microns.

The two-ply film webs stored in the form of rolls can be readily separated for processing. The film thickness may be varied by varying the feed rate of the extruders.

EXAMPLE 4

With the equipment used in Example 3, a copolyamide having a softening temperature of about 175° C. in place of the polyurethane is fed to the outer tubular slot. The temperature at the extruder head is 190° C. Here again, the width of the twice slit double-ply film web is 900 mm. each.

The thickness of the polyethylene release film is 50 microns and that of the copolyamide film 50 microns with a tolerance of ±10 percent.

The equipment used in Example 3 is modified by substituting an extruder blow head having three concentric tubular dies for the extruder blow head having two concentric tubular dies, each tubular die being fed by one extruder. The inner and outer tubular dies are fed with a high-pressure polyethylene having good flowability as a melt and having admixed thereto 0.5 percent of calcium stearate. The central tubular die is fed with a copolyamide 6/6,6/12 having admixed thereto 15 percent of a high boiling plasticizer. The softening temperature of the copolyamide is about 130° C., and the operating temperatures maintained in the extruders and at the extruder head are about 145° C.

The three-ply tubular film is expanded to a circumference of 1,400 mm. It is then slit at one side and would up. For processing, the copolyamide film can be readily removed from the polyethylene films surrounding it. The thickness of the copolyamide film is 45 microns and that of the polyethylene films about 30 microns each. The addition of a plasticizer to the copolyamide results in improved flexibility of the copolyamide film. When conforming the polyethylene to the softening characteristics of the plasticized copolyamide, it is possible to extrude and inflate at lower temperatures than those mentioned in Example 2.

EXAMPLE 6

The blown film extrusion equipment described in Example 3 is used except that the die orifice formed by the united tubular slots is 300 mm. in the extruder blow head. The two concentric tubular dies have a width of 0.6 mm. each and are connected to extruders having a conveying capacity between 30 and 90 kgs. of material per hour, variation of the conveying capacity being adjustable by varying the speed of rotation of the extruders.

The outer tubular die is fed with a thermoplastic polyurethane having a softening temperature of 165° to 170° C. and the inner tubular slot is fed with a high-pressure polyethylene of high melt viscosity. The operating temperature in both of the extruders is 190° C. and the temperature at the extruder head is also 190° C. With the extruder feeding polyurethane at a rate of 40 kgs./hr., a two-ply film is produced which after inflation and slitting on both sides gives two-ply webs of 750 mm. in width each. The thickness of the polyurethane film having hot tack ranges between 145 and 150 microns and that of the polyethylene release film is about 120 microns.

EXAMPLE 7

A three-ply tubular film is blown with the equipment of Example 6 which, however, is now equipped with an extruder head with three concentric tubular dies. The inner ply consists of the polyethylene mentioned in Example 6 while the outer tubular die is fed with the polyurethane mentioned in Example 6. The central tubular die is fed with a polyurethane having a softening temperature within the range from 125° to 130° C. The three-ply tubular film is flattened and slit on both sides. Each of the webs comprises a composite film loosely adherent to the polyurethane carrier film and consisiting of two different polyurethane plies which are undetachably united. The central ply of the polyurethane having the low softening temperature has a thickness of 50 microns and that of the film of polyurethane having the higher softening temperature and strongly bonded thereto is 20 microns. The two-ply composite polyurethane film is particularly suitable for coating sheet substrates, it being possible to adhere the composite polyurethane film by means of the polyurethane ply having the lower softening temperature without causing substantial softening of the polyurethane ply having the higher melting temperature. This provision of multi-ply commposite film consisting of strongly united layers of the same or different thermoplastic materials which, however, are more or less different in their softening temperatures is an important general principal and aspect of the present invention.

EXAMPLE 8

Using the blown film extruder unit of Example 6 and under the operating conditions mentioned therein, a polyurethane film having a circumference of about 2,400 mm. and a thickness of 33 to 40 microns is produced by increasing the extrusion rate for polyethylene to about 70 kgs./hr. and increasing the inflation ratio. The thickness of the polyethylene ply is about 65 microns. The flattened two-ply tubular film is slit at two sides and the two-ply webs having a width of 1,200 mm. each are wound up.

A polyurethane film having a width of about 2×700 mm. (circumference of the double-ply tubular film, about 1,400 mm.) can be produced with the same unit by changing the extrusion rates of the extruders and reducing the inflation ratio. In this case, the thickness is about 130 microns for the polyethylene release film and about 250 microns for the polyurethane sheet.

EXAMPLE 9

A polyurethane of low softening point (softening temperature, about 125° to 130° C.) is extruded as the central layer between two polyethylene plies by the procedure of Example 5. However, the diameter of the tubular die in the blow head is 300 mm. and the three-ply tubular film formed is expanded to a circumference of about 2,400 mm. An about 50 microns thick polyurethane film which shows aftertack even after having been stored for weeks at room temperature is extruded as the central layer between two polyethylene plies having a thickness of about 40 microns. For processing, the self-supporting polyurethane film is readily freed from the polyethylene plies covering it.

EXAMPLE 10

Using the equipment of Example 7, a three-ply tubular film is blown which consists of an inner ply of high-pressure polyethylene of low viscosity in molten form, a central layer of polyurethane having a softening temperature of 125° to 130° C., and an outer ply of copolyamide 6/6,6/12 having a softening temperature of about 130° C. After expansion of the tubular film to a circumference of about 2,400 mm., the polyurethane ply and the copolyamide ply have a thickness of about 50 microns each. The substrate ply of high-pressure polyethylene in the finished product has a thickness of about 95 microns.

The resultant composite film consisting of the undetachably united layers of polyurethane and copolyamide exhibits different optimum adhesive properties on its two major surfaces with the softening and melting temperatures being about the same.

With the same equipment but with the use of a high-pressure polyethylene of high viscosity in molten state, a polyurethane having a softening range of 165° to 170° C. is fed to the central tubular die and a polyamide 66 is fed to the outer tubular die. The extrusion rates and operating conditions are selected such that a composite film consisting of thermoplastic polyurethane and polyamide 66 is obtained, of thermoplastic polyurethane and polyamide 66 is obtained, the thickness being about 40 microns for the polyurethane ply and about 8 microns for the polyamide 66 ply. This composite film is outstandingly suited for coating textile substrates.

EXAMPLE 11

The extrusion unit of Example 7 (three-ply blow head) is used. The inner tubular die is fed with high-pressure polyethylene having elevated viscosity in molten state while the central tubular die is fed with polyurethane having a softening temperature in the range from 165° to 170° C. The outer tubular die is fed with a polyurethane softening thermoplastically at about 150° C. and having admixed thereto 0.7 percent by weight of sodium bicarbonate and 0.7 percent by weight of citric acid. This outer polyurethane layer expands to form a foamed layer as it leaves the tubular die. The operating conditions are adjusted in such a manner that the central ply of the tubing (unfoamed polyurethane) has a final thickness of about 25 microns while the layer of foamed polyurethane superposed on it has a thickness of about 400 microns. The resultant composite sheet coinsisting of a foamed and a non-foamed polyurethane layer is outstandingly suited for coating textile substrates.

A non-coated foamed copolyamide sheet (softening temperature, about 175° C.) can be produced with the unit of Example 6 by adding a blowing agent toi the copolyamide prior to extrusion. One suitable solid blowing agent is the mixture of 0.7 percent by weight of sodium bicarbonate, 0.75 percent by weight of citric acid, and 0.8 percent by weight of azodicarbonamide. The resultant foam sheet which is relatively stiff may be converted into a more flexible product be incorporating high boiling plasticizers, e.g., up to 20 percent by weight of a high boiling plasticizer.

EXAMPLE 12

A mixture which is not tacky or only slightly tacky at normal temperature but highly tacky when heated and which consists of cellulose triacetate, rosin and a high boiling plasticizer is extruded through an extruder head having two concentric tubular dies. The inner layer of the resultant double-ply tubing consists of a high-pressure polyethylene having low melt viscosity and having admixed thereto a high molecular weight hydrocarbon wax. The operating temperature in the two extruders and in the extruder head is 125° C. There is obtained a 80 microns thick film of the hot-tacky thermoplastic mixture on a release film having a thickness of 60 microns.

EXAMPLE 13

A mixture of 100 parts of polychloroprene, 50 parts of carbon black, 10 parts of plasticizer, 5 parts of zinc oxide, 2 parts of accelerator, 2 parts of antioxidant, and up to 5 parts of rosin is extruded together with high-pressure polyethylene at a temperature of 130° to 135° C. and inflated. The wall thickness of the chloroprene-based film is adjusted to about 120 microns. The resultant product is an elastomer-based sheet which can be completely vulcanized by subsequent thermal treatment. .

Thin film webs containing natural rubber and/or synthetic elastomers, if desired as a composite with other thermoplastic materials having hot tack can be produced by the process according to the invention. It is important for these and all other thermoplastic materials having hot tack and being processed in accordance with the invention that it has become possible for the first time to produce very thin film of great width by the blown film process. The width of the film webs is preferably at least about 1 m. but may be as great as 3 m. and even more. The advantages of the blown film process have, therefore, been fully realized also for thermoplastic materials having hot tack.

What is claimed is:

[1. A process for production of film of hot-tacky thermoplastic material by the blown film process, which material is tacky to the extent that in production thereof by the blown film process, wherein a tube of the material is independently extruded, the extruded tube is inflated and thereafter flattened with squeeze rollers so that walls of the tubing are superimposed, the superimposed walls become bonded together, with comprises extruding two tubes, one outside the other to produce a two ply tube comprising an inner ply and an outer ply, inflating the two ply tube, and thereafter flattening the two ply tube with squeeze rollers, and removing the flattened two ply tube from the squeeze rollers, the outer ply being said hot-tacky thermoplastic material, and the inner ply being a tack-free thermoplastic material.]

[2. A process according to claim 1, and slitting the flattened two ply tube, and winding the split two ply tube into a roll wherein hot-tacky and tack-free turns alternate.]

[3. A process according to claim 1, wherein said tack-free thermoplastic material is a polyolefin.]

[4. A process according to claim 3, wherein the polyolefin is polyethylene or polypropylene.]

[5. A process according to claim 1, which comprises extruding a third tube to produce a three-ply tube comprising an inner ply, intermediate ply and an outer ply, in which the inner ply is said ply of tack-free thermoplastic material, the intermediate ply is said ply of hot-tacky material and the outer ply is a hot-tacky thermoplastic material different from the intermediate layer or a tack-free thermoplastic material.]

[6. A process according to claim 1, in which the softening temperature of the tack-free material is not substantially in excess of the softening temperature of said hot-tacky thermoplastic material.]

[7. A process according to claim 6, wherein said tack-free material has a softening temperature which is about 10° to 80° C. lower than that of the hot-tacky material.]

[8. A process according to claim 6, wherein said tack-free material has a softening temperature which is about 10° to 40° C. lower than that of the hot-tacky material.]

[9. A process according to claim 1, which comprises extruding the hot-tacky material to form film having a thickness of about 10 to 300 microns while operating, within the following ratios of film thicknesses of the hot-tacky material to tack-free material:

hot-tacky material about 50 to 100 microns/tack-free material having about the same film thickness:

hot-tacky material less tha 50 microns/tack-free material having greater film thickness;

hot-tacky material in excess of 100 microns/tack-free material having not more than the same or lower film thickness.]

[10. A process according to claim 1, which comprises extruding the hot-tacky material to form film having a thickness of about 10 to 300 microns while operating, within the following ratios of film thicknesses of the hot-tacky material to tack-free material:

hot-tacky material about 50 to 100 microns/tack-free material having about the same film thickness;

hot-tacky material less than 50 microns/tack-free material having a greater film thickness in a ratio oif 1:1.5 to 1:2.5;

hot-tacky material in excess of 100 microns/tack-free material having a lower thickness in a ratio of 1:0.8 to 1:0.6.]

[11. A process according to claim 5, the inner ply and the outer ply having thicknesses not exceeding about 100 microns.]

[12. A process according to claim 5, the inner ply and outer ply having thicknesses of 20 to 50 microns.]

[13. A process according to claim 5, wherein the intermediate ply and the outer ply are undetachably bonded together.]

[14. A process according to claim 1, wherein a blowing agent is incorporated in the hot-tacky material prior to extrusion.]

[15. A process according to claim 1, which comprises extruding a third tube to produce a three-ply tube comprising an inner ply, intermediate ply and an outer ply in which the inner ply is said ply of tack-free thermoplastic material, the intermediate ply is said ply of hot-tacky material and the outer ply is a thermoplastic material having a blowing agent incorporated therein and is undetachably bonded to the intermediate ply.]

[16. A process according to claim 1, wherein the hot-tacky material has a softening temperature of up to 280° C.]

[17. A process according to claim 1, wherein the hot-tacky material has a softening temperature of up to 220° C.]

[18. A process according to claim 1, wherein the tack free thermoplastic material does not substantially adhere to the hot-tacky thermoplastic material and the inner ply of tack free thermoplastic material is a release ply which can be detached from the outer ply of hot-tacky thermoplastic material, the outer ply, after detachment from the inner ply being a self-supporting film.]

*19. A process for production of film of hot-tacky thermoplastic material by the blown film process, which hot-tacky material is selected from the group consisting of polyurethanes and copolyamides, having a softening temperature higher than tacky saran up to 280° C.; being extrudable at temperatures of 180° C. and higher; and which is tacky to the extent that in production thereof by the blown film process, wherein a tube of the material is independently extruded, the extruded tube inflated and thereafter flattened with squeeze rollers so that walls of the tubing are superimposed, the superimposed walls become bonded together;*

*said process comprising the steps of extruding two tubes, one outside the other to produce a two ply tube having an inner ply and an outer ply; inflating the two ply tube, and thereafter flattening the two ply tube from the squeeze rollers, the inner ply being a tack-free thermoplastic material having a softening temperature which is about 10° C. to 80° C. lower than that of the hot-tacky material; slitting the flattened two ply tube; and winding the split two ply tube into a roll wherein hot-tacky and tack-free turns alternate.*

*20. A process for production of film of hot-tacky polyurethane or copolyamide thermoplastic material by the blown film process,*

*said hot-tacky material having a softening temperature higher than tacky saran up to 280° C., being extrudable at temperatures of 180° C. and higher, and being tacky to the extent that in production thereof by the blown film process, wherein a tube of the material is independently extruded, the extruded tube inflated and thereafter flattened with squeeze rollers so that walls of the tubing are superimposed, the superimposed walls become bonded together;*

*said process comprising the steps of extruding two tubes, one outside the other, to produce a two ply tube having an inner ply of tack-free thermoplastic material with a softening temperature of about 10° to 80° C. lower than that of the hot-tacky material, and an outer ply of said hot-tacky thermoplastic material, the hot-tacky material being extruded to a thickness of about 10 to 300 microns and the ratio of hot-tacky material to tack-free material being defined as follows:*

*when the hot-tacky material is about 50 to 100 microns, the tack-free material is about the same film thickness:*

*when the hot-tacky material is less than 50 microns, the tack-free material has greater film thickness:*

*when the hot-tacky material is in excess of 100 microns, the tack-free material has not more than the same or lower film thickness;*

*inflating the two ply tube, thereafter flattening the inflated two ply tube with squeeze rollers; and removing the flattened two ply tube from the squeeze rollers.*

*21. The process of claim 20 wherein the ratio of materials is defined as follows:*

*when the hot-tacky material is about 50 to 100 microns the tack-free material is about the same film thickness;*

*when the hot-tacky material is less than 50 microns the tack-free material has a greater film thickness in a ratio of 1:1.5 to 1:2.5;*

*when the hot-tacky material is in excess of 100 microns the tack-free material has a lower thickness in a ratio of 1:0.8 to 1:0.6.*

*22. A process for production of film of hot-tacky thermoplastic material by the blown film process, which hot-tacky material is selected from the group consisting of polyurethanes and copolyamides having a softening temperature higher than tacky saran up to 280° C.; being extrudable at temperatures of 180° C. and higher; and is tacky to the extent that in production thereof by the blown film process, wherein a tube of the material is independently extruded, the extruded tube is inflated and thereafter flattened with squeeze rollers so that walls of the tubing are superimposed, the superimposed walls become bonded together;*

*said process comprising the steps of extruding two tubes, one outside the other to produce a two ply tube having an inner ply of tack-free thermoplastic material and an outer ply of said hot-tacky thermoplastic material, the tack free thermoplastic material having a softening temperature of about 10° C. to 80° C. lower than that of the hot-tacky material; the hot-tacky material being extruded to a thickness of about 10 to 300 microns and the ratio of hot-tacky material to tack-free material being defined as follows:*

*when the hot-tacky material is about 50 to 100 microns, the tack-free material is about the same film thickness;*

*when the hot-tacky material is less than 50 microns, the tack-free material has greater film thickness;*

*when the hot-tacky material is in excess of 100 microns, the tack-free material has about the same or less film thickness;*

*inflating the two ply tube, and thereafter flattening the two ply tube with squeeze rollers; and removing the flattened two ply tube from the squeeze rollers.*

*23. The process of claim 19 wherein the hot-tacky material has a softening temperature higher than tacky saran and up to 220° C. and the inner ply of tack-free thermoplastic material has a softening temperature which is 10° C. to 40° C. lower than that of the hot-tacky material.*

* * * * *